United States Patent [19]

Huybrechts

[11] 4,443,256

[45] Apr. 17, 1984

[54] ALUMINUM FLAKE DISPERSIONS

[75] Inventor: Jozef T. Huybrechts, Oud Turnhout, Belgium

[73] Assignee: E. I. Du Pont de Nemours and Company, Wilmington, Del.

[21] Appl. No.: 413,299

[22] Filed: Aug. 31, 1982

Related U.S. Application Data

[60] Division of Ser. No. 364,926, Apr. 2, 1982, abandoned, which is a continuation-in-part of Ser. No. 254,458, Apr. 15, 1981, abandoned.

[51] Int. Cl.$^3$ .............................................. C09D 5/08
[52] U.S. Cl. .................................. 106/1.05; 106/290; 106/308 Q
[58] Field of Search ................. 106/290, 1.05, 193 M, 106/308 Q; 524/441

[56] References Cited

U.S. PATENT DOCUMENTS 2,596,101 5/1952 Pritzker ............................... 106/290
4,221,601 9/1980 Augustin et al. ............... 106/193 M Primary Examiner—Lorenzo B. Hayes
Attorney, Agent, or Firm—Richard H. Burgess

[57] ABSTRACT

Aluminum flake can be dispersed advantageously in a mixture of ethylene glycol and ethylene glycol monobutyl ether for use in solvent-based dispersions of poly(arylene sulfide) and optionally fluorocarbon.

2 Claims, No Drawings

ALUMINUM FLAKE DISPERSIONS

CROSS REFERENCE TO RELATED APPLICATIONS

This is a division of application Ser. No. 364,926, filed Apr. 2, 1982, now abandoned, which is a continuation-in-part of application Ser. No. 254,458, filed Apr. 15, 1981, now abandoned which claims priority from International Application PCT/US80/01759, filed Dec. 31, 1980, under the Patent Cooperation Treaty, in the U.S. Receiving Office and designating Japan along with other countries.

BACKGROUND

Dispersions of aluminum flake have been made in mixtures of kerosene and ethylene glycol monobutyl ether and other petroleum distillates such as "Solvesso 150" from Exxon Chemicals Co. for use with solvent-based dispersions of poly(arylene sulfide) such as poly(phenylene sulfide) (PPS) and known fluorocarbon polymers such as polytetrafluoroethylene (PTFE) and copolymers of tetrafluoroethylene and hexafluoropropylene (FEP). Such solvent-based dispersions are quite suitable for spray application, but they can exhibit less than desirable settling and flow characteristics for application by coil coating techniques.

SUMMARY OF THE INVENTION

The present invention provides a dispersion of aluminum flake in a mixture of ethylene glycol and ethylene glycol monobutyl ether.

Preferably, each of the ethylene glycol and ethylene glycol monobutyl ether are present in amounts of about 40–60% by weight of the two combined; more preferably at levels of about 55% ethylene glycol, 45% ethylene glycol monobutyl ether.

The invention also provides for using such dispersions of aluminum flakes in solvent-based dispersions of poly(phenylene sulfide) and optionally particulate fluorocarbon resin, preferably PTFE or FEP.

DETAILED DESCRIPTION

By changing the solvent mix and substituting ethylene glycol for kerosene in the prior art, the stability and flow characteristics of coating compositions of the invention are improved to an extent desirable for coil coating. The advantages of the invention are especially noticeable in the wetting of the aluminum flake and the production of stable dispersions in polyphenylene sulfide.

The invention will now be illustrated by an example. Parts, percentages and proportions herein are by weight except where indicated otherwise.

EXAMPLE

Solvent-Based 66.6 PPS/16 FEP/12.75 TiO$_2$/3.65 Al Flake

Prepare a premix by grinding in a pebble mill for 48 hours or grinding in a Dyno-mill for 5 passes a blend of

| | |
|---|---|
| "Ryton" V-I PPS resin from Phillips Petroleum Co. | 22.16 |
| FEP powder from Du Pont | 5.65 |
| "Tipure R 900" TiO$_2$ pigment from Du Pont | 4.24 |
| "Triton X-100" from Rohm & Haas (isooctylphenoxy-polyethoxyethanol) | 6.14 |
| Channel Black (carbon colorant) | 2.00 |
| Cobalt blue pigment | 0.05 |
| Ethylene glycol | 32.62 |
| Ethylene glycol monobutyl ether | 26.69 |
| | 100.00 |

This premix is then mixed in the following proportions:

| | |
|---|---|
| Premix | 96.44 |
| Aluminum flake | 1.78 |
| Blend of 55 parts ethylene glycol and 45 parts ethylene glycol monobutyl ether | 1.78 |
| | 100.00 |

The coating composition has satisfactory dispersion stability and has desirable viscosity and flow characteristics for application to coiled substrate of any suitable material such as aluminum by suitable techniques such as doctor blade or rolling coating. The coating can be cured by heating 10 minutes at 400° C. This drives off the liquid carrier and coalesces into a desirable coating. Alternately, the coating can be cured at 370° C. for 15 minutes, at 425° C. for 5–7 minutes or under equivalent conditions.

I claim:

1. A dispersion consisting of aluminum flakes in a mixture of ethylene glycol and ethylene glycol monobutyl ether wherein each of the ethylene glycol and ethylene glycol monobutyl ether is present in amounts of about 40–60% by weight of the two combined.

2. The dispersion of claim 1 wherein the proportions are, by weight, about 55% ethylene glycol and 45% ethylene glycol monobutyl ether.

* * * * *